United States Patent
Arpteg

(10) Patent No.: US 10,516,906 B2
(45) Date of Patent: Dec. 24, 2019

(54) SYSTEMS, METHODS, AND COMPUTER PRODUCTS FOR RECOMMENDING MEDIA SUITABLE FOR A DESIGNATED STYLE OF USE

(71) Applicant: SPOTIFY AB, Stockholm (SE)

(72) Inventor: Anders Arpteg, Stockholm (SE)

(73) Assignee: Spotify AB, Stockholm (SE)

( * ) Notice: Subject to any disclaimer, the term of this patent is extended or adjusted under 35 U.S.C. 154(b) by 977 days.

(21) Appl. No.: 15/041,397

(22) Filed: Feb. 11, 2016

(65) Prior Publication Data

US 2017/0085929 A1 Mar. 23, 2017

Related U.S. Application Data

(60) Provisional application No. 62/220,919, filed on Sep. 18, 2015.

(51) Int. Cl.
| | |
|---|---|
| *H04N 21/00* | (2011.01) |
| *H04N 21/25* | (2011.01) |
| *G06N 20/00* | (2019.01) |
| *H04L 29/08* | (2006.01) |
| *G06F 16/783* | (2019.01) |
| *G06F 16/78* | (2019.01) |

(Continued)

(52) U.S. Cl.
CPC ........... *H04N 21/251* (2013.01); *G06F 16/43* (2019.01); *G06F 16/60* (2019.01); *G06F 16/78* (2019.01); *G06F 16/783* (2019.01); *G06N 20/00* (2019.01); *H04L 67/1097* (2013.01)

(58) Field of Classification Search
CPC .................................................. H04N 21/251
USPC ........................................................ 706/12
See application file for complete search history.

(56) References Cited

U.S. PATENT DOCUMENTS

| | | | |
|---|---|---|---|
| 7,772,478 | B2 | 8/2010 | Whitman et al. |
| 7,945,441 | B2 | 5/2011 | Thompson et al. |

(Continued)

FOREIGN PATENT DOCUMENTS

| | | |
|---|---|---|
| EP | 2207348 A2 | 7/2010 |
| WO | 2005/038666 | 4/2005 |

OTHER PUBLICATIONS

Scikit-learn: Machine Learning in Python, Pedregosa et al., JMLR 12, pp. 2825-2830, 2011.*

(Continued)

*Primary Examiner* — Hien D Khuu
(74) *Attorney, Agent, or Firm* — Merchant & Gould P.C.

(57) ABSTRACT

Media suitable for a designated style of use are recommended from among a database of media objects. A prediction engine is trained using a plurality of media object lists, each of the media object lists containing metadata associated with a plurality of media objects, the media object lists corresponding to the designated style of use, and the prediction engine being trained to calculate the likelihood that a media object is suitable for the designated style of use. The prediction engine includes a binomial classification model trained with feature vectors that include behavioral data, acoustic data and cultural data for the plurality of media objects. The trained prediction engine is applied to media objects in the database of media objects so as to calculate likelihoods that the media objects are suitable for the designated style of use. One or more media objects are recommended using the calculated likelihoods.

61 Claims, 11 Drawing Sheets

(51) Int. Cl.
*G06F 16/60* (2019.01)
*G06F 16/43* (2019.01)

(56) References Cited

U.S. PATENT DOCUMENTS

| | | | |
|---|---|---|---|
| 8,385,662 B1 | 2/2013 | Yoon et al. | |
| 9,110,955 B1 | 8/2015 | Bernhardsson | 707/748 |
| 2006/0242193 A1 | 10/2006 | Dunning | 707/102 |
| 2006/0259344 A1 | 11/2006 | Patel et al. | |
| 2009/0210415 A1 | 8/2009 | Martin et al. | |
| 2011/0099131 A1* | 4/2011 | Sellamanickam | G06N 20/00 706/12 |
| 2011/0288929 A1 | 11/2011 | Mei et al. | 707/728 |
| 2013/0332842 A1 | 12/2013 | Bernhardsson et al. | 715/738 |
| 2014/0222422 A1 | 8/2014 | Sarikaya et al. | |
| 2014/0279756 A1* | 9/2014 | Whitman | G06N 5/003 706/12 |
| 2014/0304265 A1 | 10/2014 | Topalcas et al. | 707/737 |
| 2015/0248618 A1 | 9/2015 | Johnson | 706/46 |

OTHER PUBLICATIONS

Int'l Preliminary Report on Patentability issued in connection with Int'l Appln. No. PCT/US2016/047461 dated Mar. 20, 2018.
Collaborative Filtering. Wikipedia. N.p., n.d. Web. Jul. 18, 2015. <https://en.wikipedia.org/wiki/Collaborative_filtering>.
Koren, Yehuda, Robert Bell, and Chris Volinsky. "Matrix Factorization Techniques for Recommender Systems." Computer 8 (2009): 42-49. Web. Jul. 18, 2015. <http://www2.research.att.com/~volinsky/papers/ieeecomputer.pdf>.
Johnson, Christopher C. "Logistic Matrix Factorization for Implicit Feedback Data." NIPS. Web. Jul. 18, 2015. <http://stanford.edu/~rezab/nips2014workshop/submits/logmat.pdf>.
Google, *Word2vec*, https://code.google.com/p/word2vec (last visited Feb. 2, 2016).
The Echo Nest™, *Acoustic Attributes Overview*, http://developer.echonest.com/acoustic-attributes.html (last visited Feb. 2, 2016).
Scikit-Learn Developers, *Scikit Implementation* (http://scikit-learn.org/stable/modules/linear_model.html#logistic-regression) (last visited Feb. 2, 2016).
Dato, *GraphLab Create™ API—Factorization Recommender* (https://dato.com/products/create/docs/generated/graphlab.recommender.factorization_recommender.FactorizationRecommender.html) (last visited Feb. 2, 2016).
Rendle, S., *Factorization Machines*, Data Mining (ICDM), 2010 IEEE $10^{th}$ International Conference on, pp. 995-1000 (Dec. 13, 2010), http://www.csie.ntu.edu.tw/~b97053/paper/Rendle2010FM.pdf.
Int'l Search Report and Written Opinion of the Int'l Searching Authority for Int'l Pat. Appl'n No. PCT/US2014/029234, Jun. 25, 2014, (10 pages).
Y. Shi et al.; "Tags as Bridges between Domains: Improving Recommendation with Tag-Induced Cross-Domain Collaborative Filtering"; User Modeling, Adaption and Personalization; Springer Berlin Heidelberg; Berlin; Jul. 11, 2011, pp. 305-316.
Daniel P.W. Ellis, et al., "The Echo Nest Musical Fingerprint", 2010.
Paolo Cremonesi, et al., "Cross-domain Recommender Systems", IEEE-2011.

* cited by examiner

| 8311 | Westside Bugg Presents... The Best Of The West |
| 8312 | Bugg |
| 8320 | bugg |
| 8325 | Casanovas – Bästa buggatar |
| 8334 | bugg |
| 8348 | Bugg |
| 8389 | Don't bugg me |
| 8402 | BRÖLLOP BUGG |
| 8426 | Dansband bugg |
| 8447 | bugg |
| 8455 | Mogen Bugg |

```
In  [19]:  sorted( zip ( features.columns, model.coef_[ 0 ] ) )
Out[19]:  [( 'factor - 12 ',  6.0205992608490586 ),
          ( 'factor - 02 ',  -3.8387979170398059 ),
          ( 'factor - 04 ',  -3.8098689579922596 ),
          ( 'factor - 01 ',  -3.3952763080050397 ),
          ( 'factor - 11 ',  -3.0175673734271027 ),
          ( 'factor - 16 ',  2.620593681 6764335 ),
          ( 'factor - 24 ',  2.3910897861057294 ),
          ( 'factor - 25 ',  2.2768366628929044 ),
          ( 'factor - 30 ',  2.2678776691181151 ),
          ( 'factor - 23 ',  -2.0774088725309099 ),
          ( 'factor - 39 ',  -2.0617286669664425 ),
          ( 'genre - dansband ',  1.9620704070266282 ),
          ( 'factor - 14 ',  -1.8799420715644304 ),
          ( 'factor - 08 ',  -1.8414874681832472 ),
          ( 'factor - 28 ',  -1.7544978136641647 ),
          ( 'factor - 07 ',  -1.720052460317357 ),
          ( 'factor - 35 ',  -1.7025796108506841 ),
          ( 'factor - 33 ',  -1.6729417470108021 ),
          ( 'factor - 29 ',  1.6158975589803322 ),
          ( 'factor - 00 ',  1.6100799519965445 ),
          ( 'factor - 22 ',  -1.5512303960772569 ),
          ( 'factor - 13 ',  1.4009704129788856 ),
          ( 'organism_score ',  1.345997011143828 ),
          ( 'factor - 36 ',  -1.2998062293719455 ),
          ( 'factor - 20 ',  -1.264046455403582 ),
          ( 'factor - 31 ',  -1.1758623867482672 ),
          ( 'factor - 37 ',  -1.1671043784725275 ),
          ( 'familiarity_score ',  1.0963518913003236 ),
          ( 'factor - 18 ',  1.0740610136607267 ),
```

FIG. 6

SYSTEMS, METHODS, AND COMPUTER PRODUCTS FOR RECOMMENDING MEDIA SUITABLE FOR A DESIGNATED STYLE OF USE

CROSS REFERENCE TO RELATED APPLICATION

This application claims priority to U.S. Provisional Application No. 62/220,919 filed Sep. 18, 2015, the contents of which are incorporated herein by reference.

BACKGROUND

Field

This disclosure relates generally to media content recommendation, and more particularly to systems, methods, and computer products for recommending media for a designated style of use.

Related Art

Media distribution (e.g. streaming) platforms have allowed consumers unprecedented access to large catalogs of media content, such as songs and videos. It is common for these platforms to include features that recommend media to users based on a designated style of use, for example, songs suitable for a certain style of dance, or videos suitable for a certain activity such as an exercise workout or cooking lesson.

Recommending media for a designated style of use has generally required a high degree of human curation. Media distribution companies typically employ editorial staff to manually create lists of songs or videos for various styles of use. These lists are then made accessible to the user of a media distribution platform in the form of playlists, radio stations, video channels, or other media discovery features.

The foregoing approaches suffer from several shortcomings in scalability, accuracy and efficiency. Human curation requires someone to listen to or view each media item and manually designate (i.e., tag) the media item as suitable for a style of use. For most media distribution platforms, with ever-expanding catalogs typically comprising millions of songs or videos, applying such methods at a scale that is comprehensive, consistent and adaptable to new styles of use is impractical. Human curation does not provide information on songs or videos that have not yet been written, listened to or analyzed. Moreover, human curation is dependent on the accuracy of the editorial staff in tagging the media content and the results of the curation are not personalized to the tastes of individual users of the media distribution platform. There has yet to be a technical solution for applying insights gleaned from human curation at scale to large catalogs of untagged media content to provide personalized recommendation of media content for a designated style of use.

SUMMARY

The example embodiments described herein address the foregoing difficulties by providing a technical solution for personalized recommendation of media content for a designated style of use.

In one example embodiment, a prediction engine is trained using a plurality of media object lists, each of the plurality of media object lists containing metadata associated with a plurality of media objects, the media object lists corresponding to a designated style of use and the prediction engine being trained to calculate the likelihood that a media object is suitable for the designated style of use. The prediction engine includes a binomial classification model trained with feature vectors that include behavioral data for the plurality of media objects, acoustic data for the plurality of media objects and cultural data for the plurality of media objects. The trained prediction engine is applied to media objects in the database of media objects so as to calculate likelihoods that the media objects are suitable for the designated style of use. One or more media objects are recommended based on the calculated likelihoods.

In another example embodiment, the likelihoods calculated by the prediction engine are used to provide personalized recommendations to a user of media objects suitable for a designated style of use. In this example, a factorization machine is trained using tensor data for a plurality of user-media object pairs. Tensor data includes a user identity, a media object identity, a sentiment score quantifying positive or negative user propensity for the media object, and the likelihood calculated by the prediction engine that the media object is suitable for the designated style of use. The factorization machine is applied to a specific user and to media objects in the database of media objects to identify media objects suitable for the designated style of use and recommended for the specific user.

The sentiment score, for example, may be a negative value when signals such as the duration over which the user played the media object is less than a threshold value and a positive value when the duration over which the user played the media object is greater than the threshold value.

In one example, training the prediction engine includes selecting a positive set of training media objects including only media objects taken from media object lists corresponding to the designated style of use and selecting a negative set of training media objects from media objects among the database of media objects that are not in the positive set. In this example, feature vectors are generated for media objects from both the positive set and the negative set and the binomial classification model is trained using the feature vectors.

In another example, training the factorization machine includes generating tensor data for a plurality of user-media object pairs. Tensor data includes a user identity, a media object identity, a sentiment score quantifying positive or negative user propensity for the media object, and the likelihood calculated by the prediction engine that the media object is suitable for the designated style of use, inputting the tensor data into the factorization machine, and generating, by the factorization machine, a model constructed to output a recommendation score based on an input of a latent feature vector for a user and a latent feature vector for a media object.

In one example aspect, applying the factorization machine includes calculating recommendation scores for a plurality of user-media object pairs using the model generated by the factorization machine, sorting the calculated recommendation scores, and recommending media objects from among the database of media objects that are suitable for the designated style of use and personalized for a specific user based on the sorting of the recommendation scores.

With respect to the behavioral data, acoustic data and cultural data used for training of the prediction engine, in one example aspect, the behavioral data comprises latent data calculated using collaborative filtering or other machine learning techniques and represented as latent feature vectors for individual media objects among the database of media objects and individual user profiles. In another example aspect, the acoustic data comprises parameters quantifying characteristics of the raw audio data of songs from among the database of songs. In yet another example aspect, the cultural data comprises data extracted from online content on the web, such as news data, social media data or blog content.

The plurality of media object lists corresponding to the designated style of use may be user-generated and may each have a title or tag that includes a word or phrase associated with the designated style of use. In such examples, the plurality of media object lists corresponding to the designated style of use are determined to be corresponding to the designated style of use based on analyzing text in the titles or tags of the plurality of media object lists.

In one example, the binomial classification model is a logistic regression model based on the function $$\min_{\omega,c} \frac{1}{2}\omega^T \omega + C \sum_{i=1}^{n} \log(\exp(-y_i(X_i^T \omega + c)) + 1),$$

where n is a number of training data points, $y_i$ is a target value, $X_i$ represents the feature vectors, $\omega$ represents coefficients of the prediction engine, c is a constant scalar value estimated during training of the prediction engine, and C is a regularization parameter. The classification model may, in other embodiments, comprise decision trees or support vector machines.

This brief summary has been provided so that the nature of this disclosure may be understood quickly. A more complete understanding can be obtained by reference to the following detailed description and to the attached drawings.

BRIEF DESCRIPTION OF THE DRAWINGS

The features and advantages of the example embodiments of the invention presented herein will become more apparent from the detailed description set forth below when taken in conjunction with the following drawings.

FIG. 5 is a view explaining the process of extracting media object lists according to an example embodiment.

FIG. 6 is a view explaining a trained prediction engine according to an example embodiment.

DETAILED DESCRIPTION

The example embodiments described herein provide systems, methods and computer products for recommending media objects suitable for a designated style of use from among a database of media objects. This description is not intended to limit the application to the example embodiments presented herein. In fact, after reading the following description, it will be apparent to one skilled in the relevant art(s) how to implement the following example embodiments in alternative embodiments (e.g., in domains outside of media content recommendation).

Figure 1:
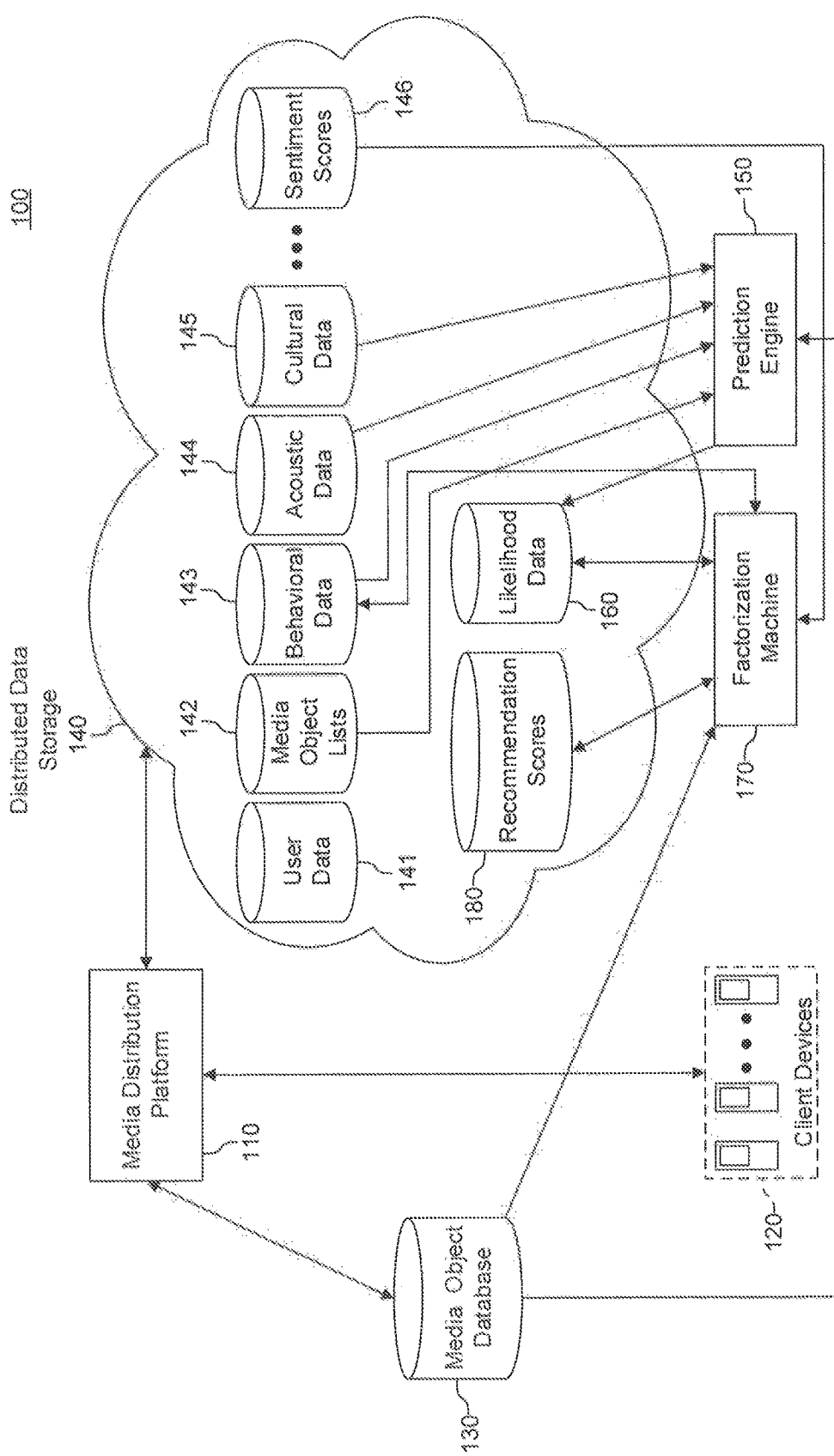
FIG. 1 is an architectural overview of a system for recommending media objects for a designated style of use according to an example embodiment.

FIG. 1 is an architectural overview of a system 100 for recommending media objects for a designated style of use according to an example embodiment.

Media distribution platform 110 is a platform for distributing digital media content to end-users on client devices 120, each client device communicatively coupled to media distribution platform 110. Media distribution platform 110 delivers a variety of media objects, including, but not limited to songs, audiobooks, podcasts, videos, movies and television shows. Media objects are stored in the form of media files in media object database 130 communicatively coupled to media distribution platform 110. Media distribution platform 110 distributes media to client devices 120 as downloadable objects (i.e. media files), live streaming objects (e.g. radio stations or video channels), on-demand streaming media, and so forth. Media distribution platform 110 also delivers media-related applications and services to client devices 120. Media distribution platform 110 is also able to store and retrieve data from distributed data storage 140.

Client devices 120 are computer hardware and/or software that allow an end-user to access and interact with the media content and services made available by media distribution platform 110. Client devices 120 access the media objects stored in media object database 130 and the data of distributed data storage 140 through the media distribution platform 110.

Media object database 130 stores a catalog of media objects in the form of media files, as well as metadata associated with the media objects such as song or video titles, artist names, song or video durations, and associated album titles.

Distributed data storage 140 stores data used by and collected from media distribution platform 110. Distributed data storage 140 may be a distributed file system such as, for example, any known or future known distributed file system and associated software framework such as an Apache Hadoop Distributed File System (HDFS) (i.e. "Hadoop Cluster") and the Apache MapReduce framework. Data from distributed data store 140 may be queried or processed using a cluster computing framework such as Apache Spark. Examples of data stored in distributed data storage 140 include, but are not limited to, user data 141, media object lists 142, behavioral data 143, acoustic data 144, cultural data 145, sentiment scores 146, likelihood data 160 and recommendation scores 180.

User data 141 includes data specific to each end-user on client devices 120. User data 141 includes, for example, user profiles containing biographical data, user settings data and interaction data. Biographical data includes, for example, identifying information such as a username, personal information, such as a photograph or biographical description, and social data, such as one or more social media profiles associated with an end-user. User settings data includes settings or preferences for media distribution platform 110 or client device 120 that are individually selected and/or set by each end-user. User data 141 also includes interaction data collected from interactions performed by the end-users on media distribution platform 110 (e.g. media objects played by the end-user, media object lists created by the end-user, applications executed by the end-user, etc.). Each end-user of media distribution platform 110 has a user profile storing the end-user's particular biographical data, user settings data and interaction data.

Media object lists 142 are lists of media objects from media object database 130. The media object lists are either user-generated at individual ones of client devices 120, automatically generated, or created by an editorial staff.

Behavioral data 143 includes latent data in the form of latent vectors that encode behavior usage patterns between end-users and media objects as well as relationships between media objects. The latent vectors are machine-generated using machine learning techniques such as item-based collaborative filtering or natural language processing. Latent vectors are stored in behavioral data 143 for individual media objects and user profiles in media distribution platform 110. These vectors are periodically recalculated using a parallel implementation of natural language processing algorithms or tools such as the publicly available Word2vec, (https://code.google.com/p/word2vec/). Word2vec and similar natural language processing tools are used to map words to vectors in a d-dimensional space using language context learned from a large corpus of text. For example, Word2vec can generate vector representations of words by learning the context and relationships between words as found in a large corpus of encyclopedia entries, newspaper articles or books. Analogously, media distribution platform 110 utilizes a modified Word2vec algorithm to individually represent each media object of media object database 130 and each user profile as vectors in a d-dimensional space, each dimension quantifying a latent feature of the media object or user profile. The modified Word2vec algorithm does this by learning the context and relationships between media objects and user profiles based on user interaction data, such as that stored in individual user profiles of user data 141 (e.g. information on how users play certain media objects, add media objects to media object lists, etc.). In addition to the Word2vec algorithm, other known or future known natural language processing techniques can be used to calculate vector representations of media objects and user profiles of media distribution platform 110 in order to generate behavioral data 143.

Acoustic data 144 includes data derived from the raw audio, image or video information of media objects stored in media object database 130. These include, for example, semantic scores such as those provided by The Echo Nest™ (http://developer.echonest.com/acoustic-attributes.html) or provided by other music intelligence and data platforms. Example semantic scores provided by The Echo Nest™ for quantifying properties of raw audio data include, for example, scores quantifying acousticness, beat strength, bounciness, danceability, dynamic range, energy, flatness, instrumentalness, liveness, loudness, mechanical features, organic features, speechiness, or valence.

Cultural data 145 includes any other data related to the media objects in media object database 101 that are not derived from behavioral data 143, raw media data or the metadata of the media objects. For example, data extracted from online content from the web such as news data, social media data or blog data. Cultural data 145 may also be quantified as scores. For example, song objects may have a genre score quantifying the degree to which the song matches a designated genre of music (e.g. a pop genre score, or a blues genre score) or a familiarity score quantifying how well the public at large is familiar with the song or the artist behind the song.

Sentiment scores 146 are scores that quantify a user's positive or negative propensity for a media object based taking the maximum of signals such as the duration a user listens to or views the media object and in what context the media object was played. Each sentiment score quantifies a single user-media object pair. The sentiment score is a negative value if the user did not like the media object (e.g. quickly skipped or turned off the media object), and a positive value otherwise. As just one example, a sentiment score for a user-media object pair may be a negative value N if the average duration for which the user played the media object is less than a threshold value T, and a positive value P if the average duration for which the user played the media object is greater than T. In the case where users prefer new media objects, taking the maximum of the sentiment score at any time point ensures a user's sentiment for the media object. Examples of values for a sentiment score may be N=−1.0 and P=0.3 where T=10. In such an example, if a user plays a media object for an average of less than 10 seconds, the sentiment score is −1 and if the user plays the media object for more than 10 seconds, the sentiment score is 0.3.

Prediction engine 150 includes a binomial model that can be trained to calculate the likelihood that a media object is suitable for a designated style of use. In this embodiment, the binomial classification model is a logistic regression model. In other embodiments, the classification model may be a decision tree or support vector machine. As described more fully below with respect to FIG. 4, prediction engine 150 can be trained using a subset of media objects selected from media object lists 142 corresponding to the designated style of use. The logistical regression model is trained using behavioral data 143, acoustic data 144 and cultural data 145 associated with this selected subset of media objects. The binomial classification model, for example, may be any known or future known logistical regression model such as the publicly available Scikit implementation (http://scikit-learn.org/stable/modules/linear_model.html#logistic-regression).

Likelihood data 160 includes data that quantifies the likelihood that a media object is suitable for a designated style of use and results from inputting data associated with the media object into prediction engine 150.

Factorization machine 170 provides recommendations, to a specific user, of media objects from media object database 130 that are both suitable for a designated style of use and recommended to the specific user. Factorization machine 170 can be any known or future known factorization machine such as Dato's GraphLab Create™ factorization machine (https://dato.com/products/create/docs/generated/graphlab.recommender.factorization_recommender.FactorizationRecommender.html) or any known or future known generalization of matrix factorization.

Factorization machine 170 combines likelihood data 160 with other data including, but not limited to, user data 141, sentiment scores 146 and metadata from media object database 130 to generate a model that can take as an input a latent feature vector for a user and a latent feature vector for a media object and output a recommendation score 180 for that user-media object pairing.

Figure 9:
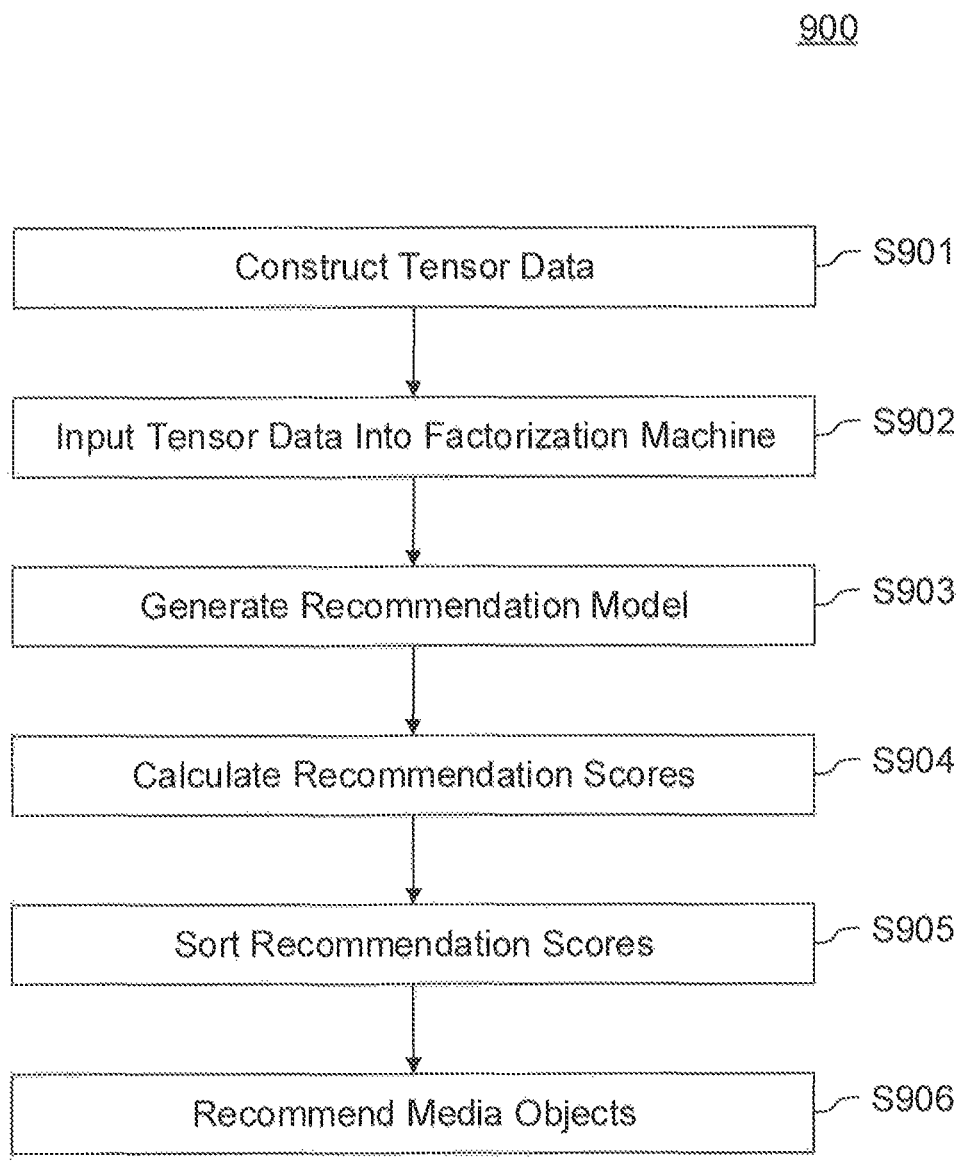
FIG. 9 is a more detailed flow diagram explaining the process steps of training and applying a factorization machine according to an example embodiment.

Recommendation scores 180 each quantify both the suitability of a media object for a designated style of use and for a specific user's listening or viewing preferences. Recommendation scores 180 are each calculated by factorization machine 170 for a given user-media object pair and, as described more fully below with respect to FIG. 9, are used by factorization machine 170 to provide personalized recommendations of media objects suitable for a designated style of use and recommended to a specific user.

Figure 2:
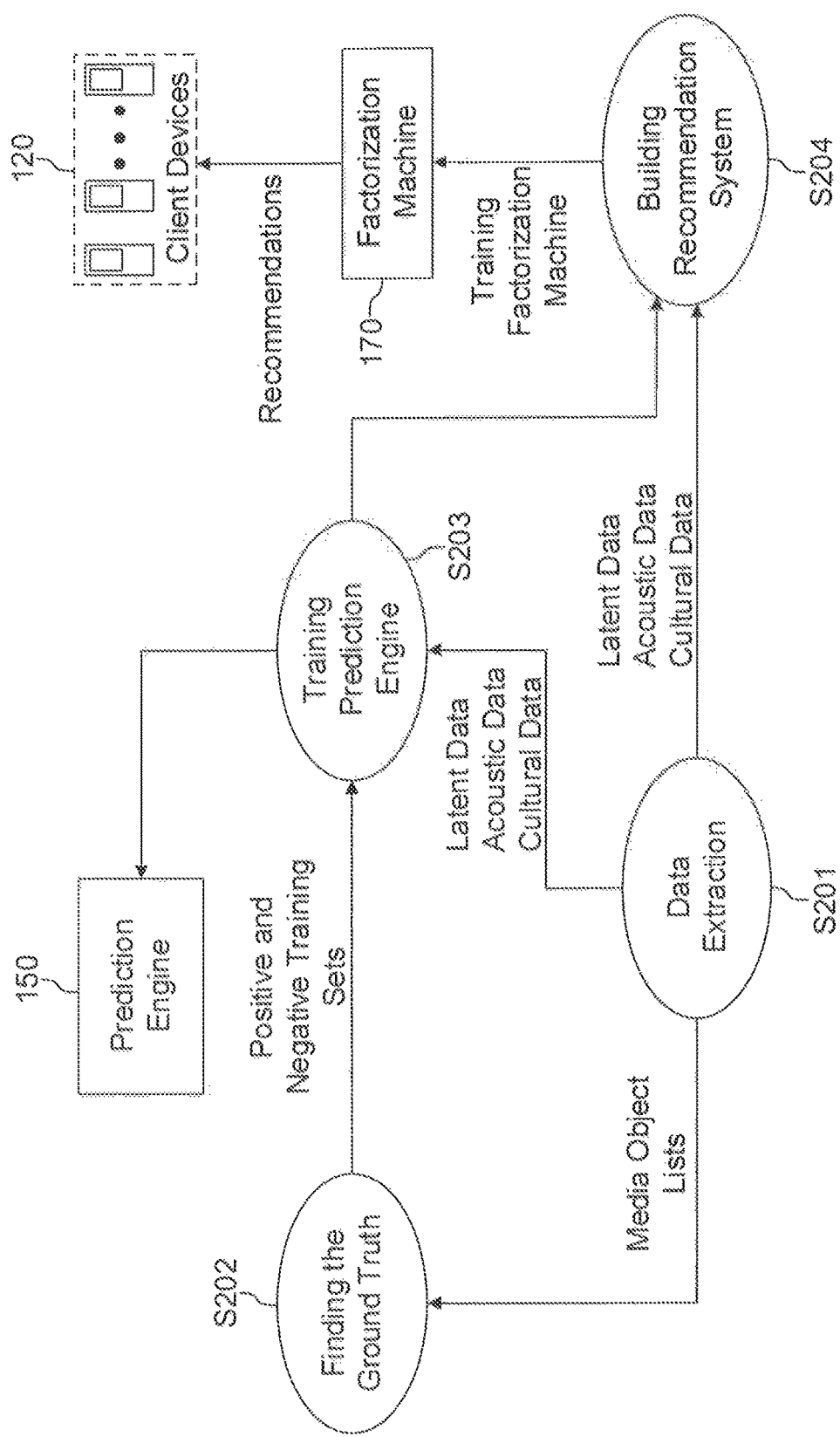
FIG. 2 illustrates a conceptual overview of a process for recommending media objects for a designated style of use according to an example embodiment.

FIG. 2 illustrates a conceptual overview of a process for recommending media objects for a designated style of use according to example embodiments described herein. The process can be performed, for example, by the system of FIG. 1.

In general terms, example embodiments described herein involve a first step S201 of extracting data from distributed data storage 140, including media object lists corresponding to a designated style of use. In step S202, the media object lists and the media objects referenced within them are then used to determine a "ground truth", i.e. characteristics of media objects that are suitable for a designated style of use. This is done by creating both a positive and negative training set of media objects based on the media object lists. In step S203, these training sets are used, along with behavioral, acoustic and cultural data to train a prediction engine. The trained prediction engine is applied to media objects from among media object database 130 to calculate likelihoods that the media objects are suitable for the designated style of use. In step S204, likelihoods calculated by the prediction engine are then used in a recommendation system that provides recommendations to a specific user of media objects both suitable for the designated style of use and recommended to the user.

Figure 3:
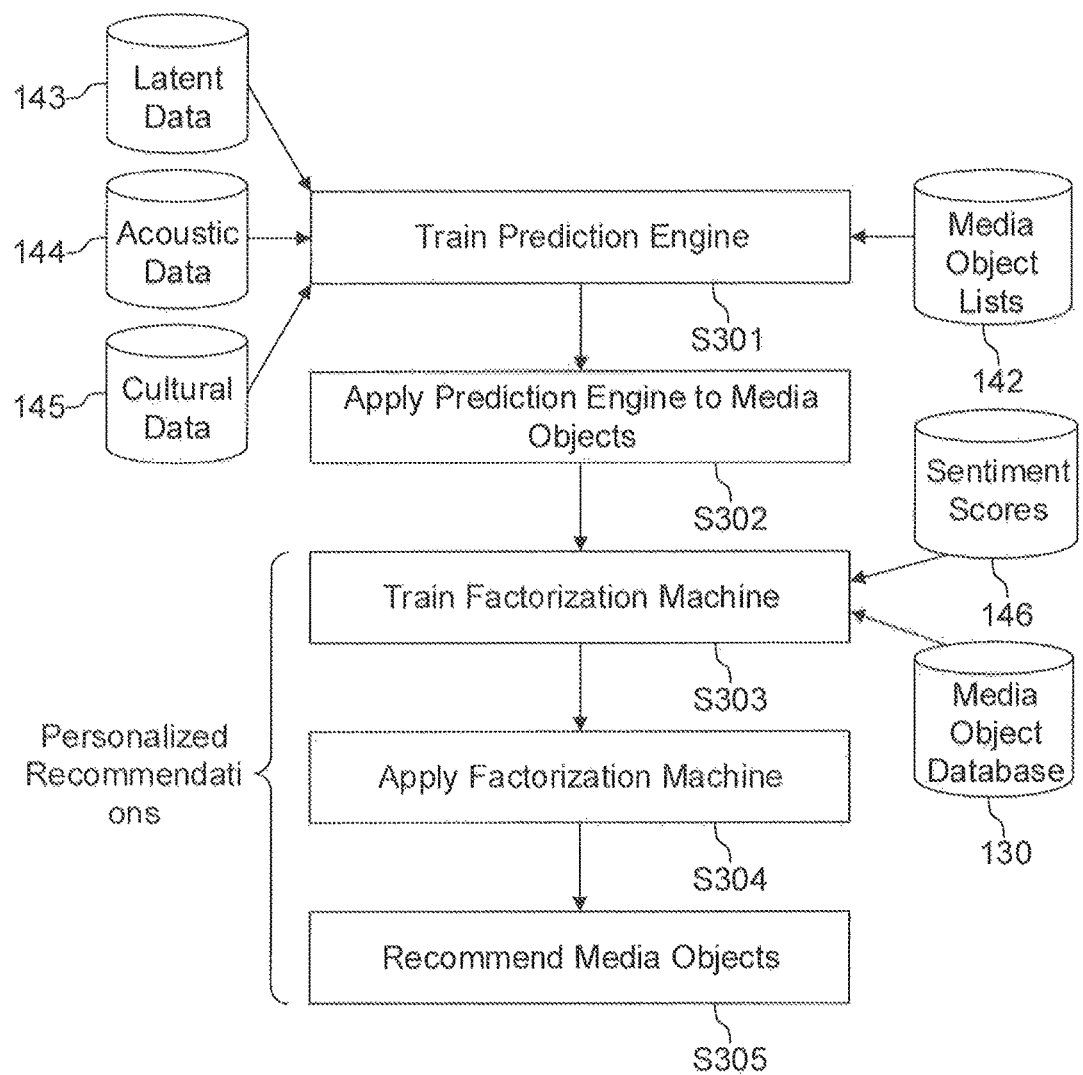
FIG. 3 is a flow diagram for explaining a process for recommending media objects for a designated style of use according to an example embodiment.

FIG. 3 is a flow diagram for explaining a process 300 for recommending media objects for a designated style of use according to an example embodiment. The process can be performed, for example, by the system of FIG. 1.

In FIG. 3, prediction engine 150 is trained using media objects from a plurality of media object lists, the media object lists corresponding to the designated style of use and prediction engine 150 being trained to calculate the likelihood that a media object is suitable for the designated style of use. Prediction engine 150 includes a binomial classification model trained with feature vectors that include behavioral data 143, acoustic data 144 and cultural data 145 for each of the media objects. Once trained, prediction engine 150 is then applied to media objects in media object database 130 so as to calculate likelihoods that the media objects are suitable for the designated style of use using behavioral data 143, acoustic data 144 and cultural data 145. The calculated likelihoods are represented, for example, as a probability. The likelihoods calculated by prediction engine 150 are then refined to give personalized recommendations. Factorization machine 170 is trained using tensor data for a plurality of user-media object pairs. Tensor data includes a user identity, a media object identity, a sentiment score quantifying positive or negative user propensity for the media object, and the likelihood calculated by prediction engine 150 that the media object is suitable for the designated style of use. Factorization machine 170 is then applied to a specific user and to media objects from media object database 130 so as to identify media objects suitable for the designated style of use and recommended for the specific user.

In more detail, in step S301, prediction engine 150 is trained using media objects referenced in one or more media object lists that are determined to correspond to a designated style of use. For example the designated style of use may be a dance style, for example, salsa, and a media object list might be identified as containing media objects (i.e., songs) suitable for salsa that are in turn used to train prediction engine 150. As an alternate example, the designated style of use may be a style of exercise, for example, yoga, and one or more media object lists identified as containing media objects (i.e., videos) suitable for yoga are used to train prediction engine 150. The process of training prediction engine 150 is explained in further detail below with respect to FIG. 4.

In step S302, prediction engine 150 is applied to media objects in media object database 130 using behavioral data 143, acoustic data 144 and cultural data 145 to obtain likelihoods that the media objects are suitable for the designated style of use.

In step S303, factorization machine 170 is trained to recommending media objects from media object database 130 to a specific user that are both suitable for a style of use designated by the specific user and that are recommended for the specific user. This is done by training factorization machine 170 using sentiment scores 146 and the likelihoods obtained by prediction engine 150.

In step S304, factorization machine 170 is applied for a specific user and a designated style of use to media objects in media object database 130 so as to obtain media objects suitable for the designated style of use and recommended for the specific user.

In step S305, the media objects are recommended to the specific user.

Steps S303 to S305 are described in more detail below with respect to FIG. 9.

Figure 4:
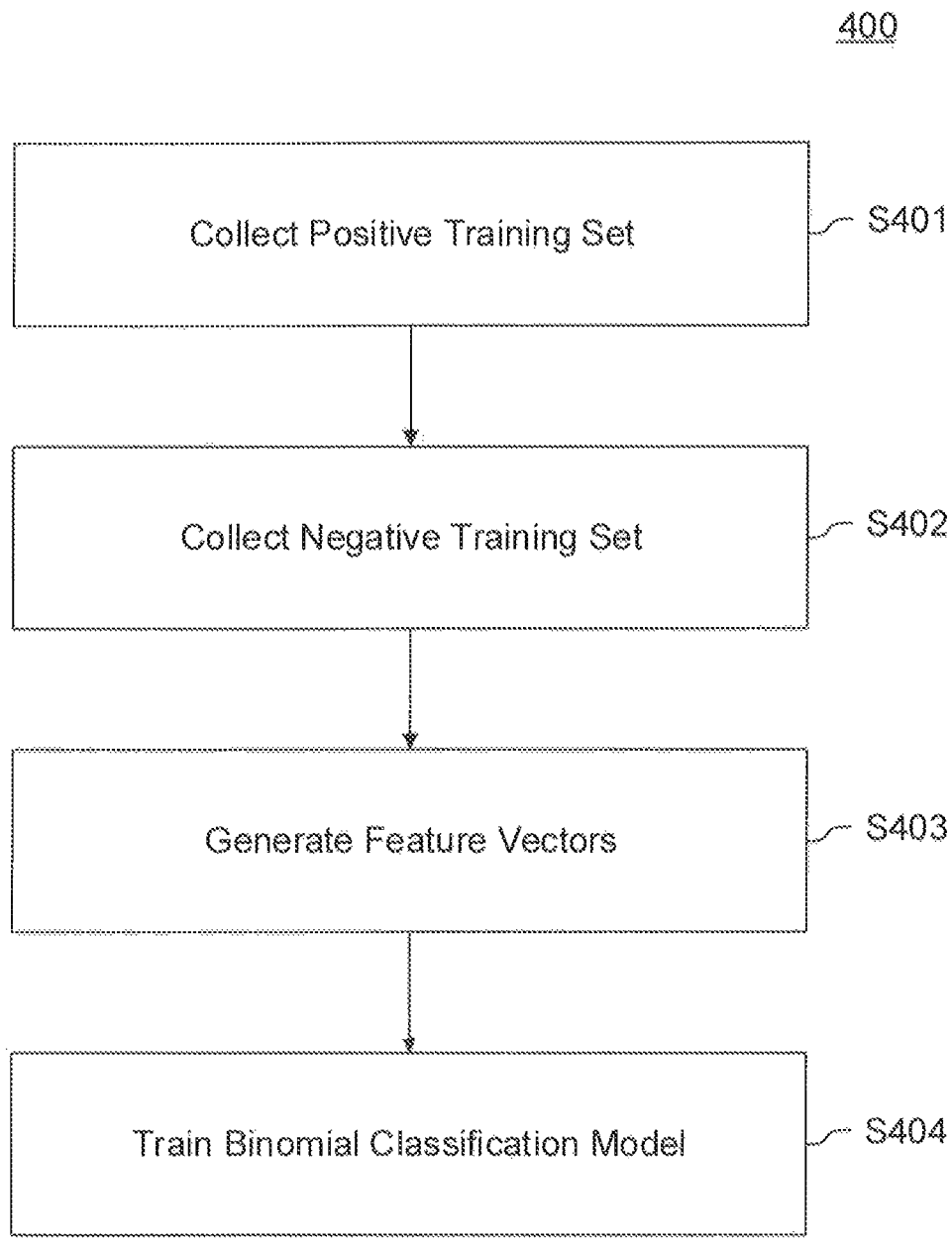
FIG. 4 is a flow diagram for explaining a process for training a prediction engine according to an example embodiment.

FIG. 4 is a more detailed flow diagram for explaining a process 400 for training a prediction engine according to an example embodiment.

Briefly, in FIG. 4 training prediction engine 150 includes first collecting a positive set of training media objects including only media objects referenced or listed in media object lists 142 corresponding to the designated style of use. Next, a negative set of training media objects is collected from media objects among media object database 130 that are not in the positive set. Feature vectors are then generated for media objects from both the positive set and the negative set and the binomial classification model of prediction engine 150 is trained using the feature vectors.

In more detail, in step S401, the positive training set is collected. This is done by using natural language processing methods to identify media object lists having titles or tags that include words or phrases associated with or having similarity to the designated style of use. The positive training set is then assembled by including media objects identified from these media object lists.

FIG. 5 is a view explaining the process of media object list extraction according to an example embodiment. In FIG. 5, list 500 is shown of several media object lists corresponding to the dance style "bugg" that have been identified using natural language processing based on occurrences of the word "bugg" in the media object list titles as well as words or phrases having a root or other association to the word "bugg" such as "Basta" and "buggatar".

Returning to FIG. 4, in step S402, the negative training set is collected. The negative training set includes media objects selected from media object database 130 that are otherwise not among the media objects in the positive training set. The number of media objects in each of the positive and negative training sets is selected such that both sets are of comparable sample size.

In step S403, feature vectors are then generated for media objects from both the positive set and the negative set. Each feature vector includes behavioral data 143 (i.e. the latent feature vector for the media object), acoustic data 144 (e.g. semantic scores), and cultural data 145 (e.g. genre scores).

In step S404, the binomial classification model of prediction engine 150 is trained using the feature vectors. In one example, provided herein, the logistical regression model is the publicly available Scikit regression model and is based on the following function:

$$\min_{\omega,c} \frac{1}{2}\omega^T\omega + C\sum_{i=1}^{n} \log(\exp(-y_i(X_i^T\omega + c)) + 1),$$

where n is a number of training data points, $y_i$ is a target value, $X_i$ represents the feature vectors, $\omega$ represents coefficients of the prediction engine, c is a constant scalar value estimated during training of the prediction engine, and C is a regularization parameter. Example results are shown in FIG. 6.

FIG. 6 is a view explaining a trained prediction engine according to an example embodiment. In FIG. 6, coefficients resulting from the training step S404 for the example dance style "bugg" are shown. Each dimension of the feature vectors used in the training is listed in column 610 and the coefficients that weight each dimension are listed in column 620. In the example, there are 87 total dimensions, of which those with coefficients of greater weight are depicted in FIG. 6. The dimensions are listed in order of coefficients from greatest weight at the top to least weight at the bottom. The dimensions depicted in FIG. 6 are those weighted most heavily when determining whether a media object is suitable for the "bugg" dance style. Among the dimensions shown is a cultural data dimension corresponding to the genre score "dansband" (i.e. dansbandmusic), a genre of music associated with the dance style "bugg". The "dansband" dimension is shown by the value of its coefficient to be of high significance in determining media objects suitable for the "bugg" dance style.

Figure 7:
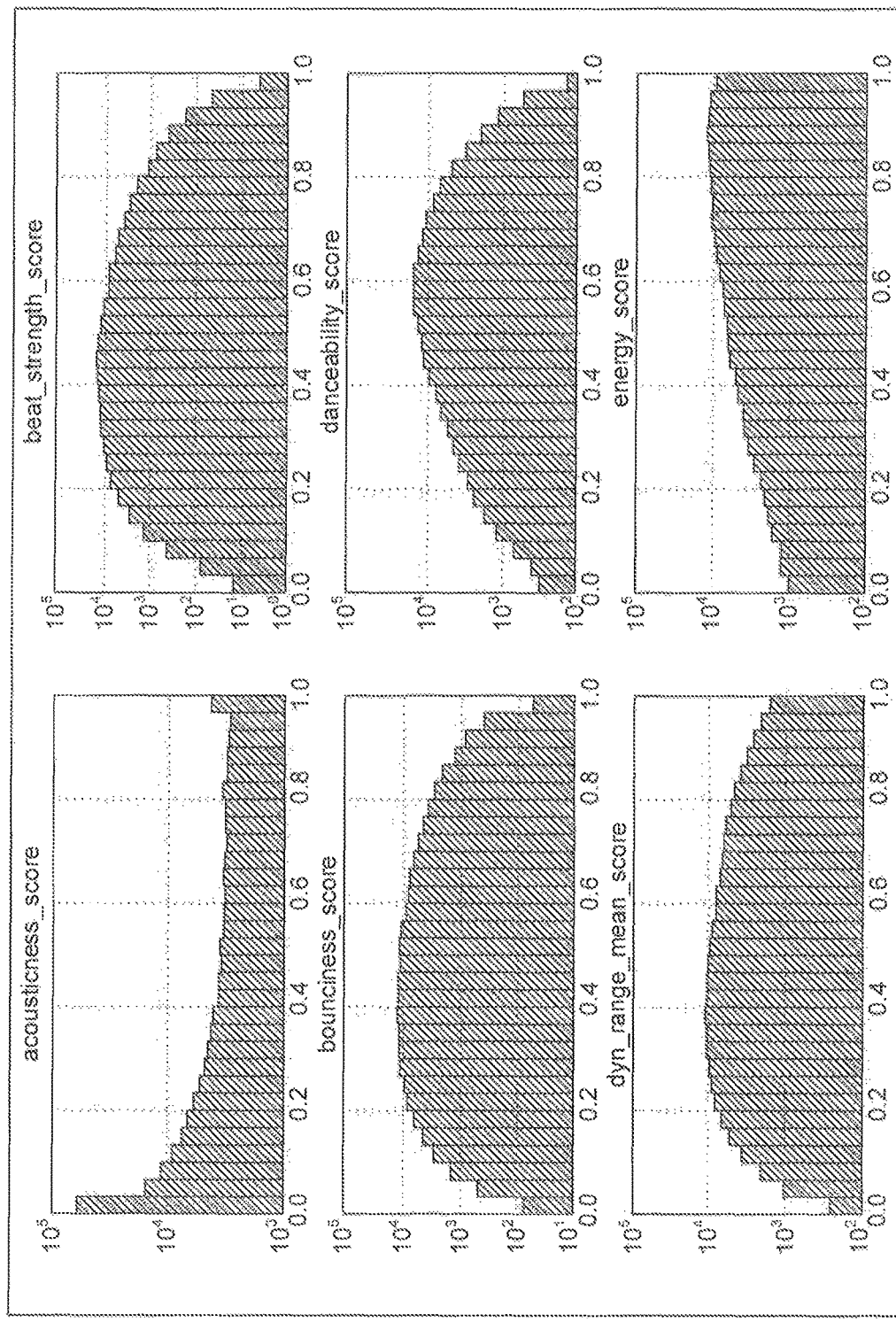
FIG. 7 is a view of example graphs depicting histograms of acoustic features for media objects in a training set.

FIG. 7 is a view of example graphs depicting histograms of acoustic features for media objects in a training set. The acoustic data shown in the example include the Echo Nest™ acousticness score, beat strength score, bounciness score, danceability score, dynamic range mean score, and energy score. The histograms show that the selection of a training set from media object lists identified as corresponding to a designated style of use is effective, since media objects of the training set appear to have similar acoustic features.

Figure 8:
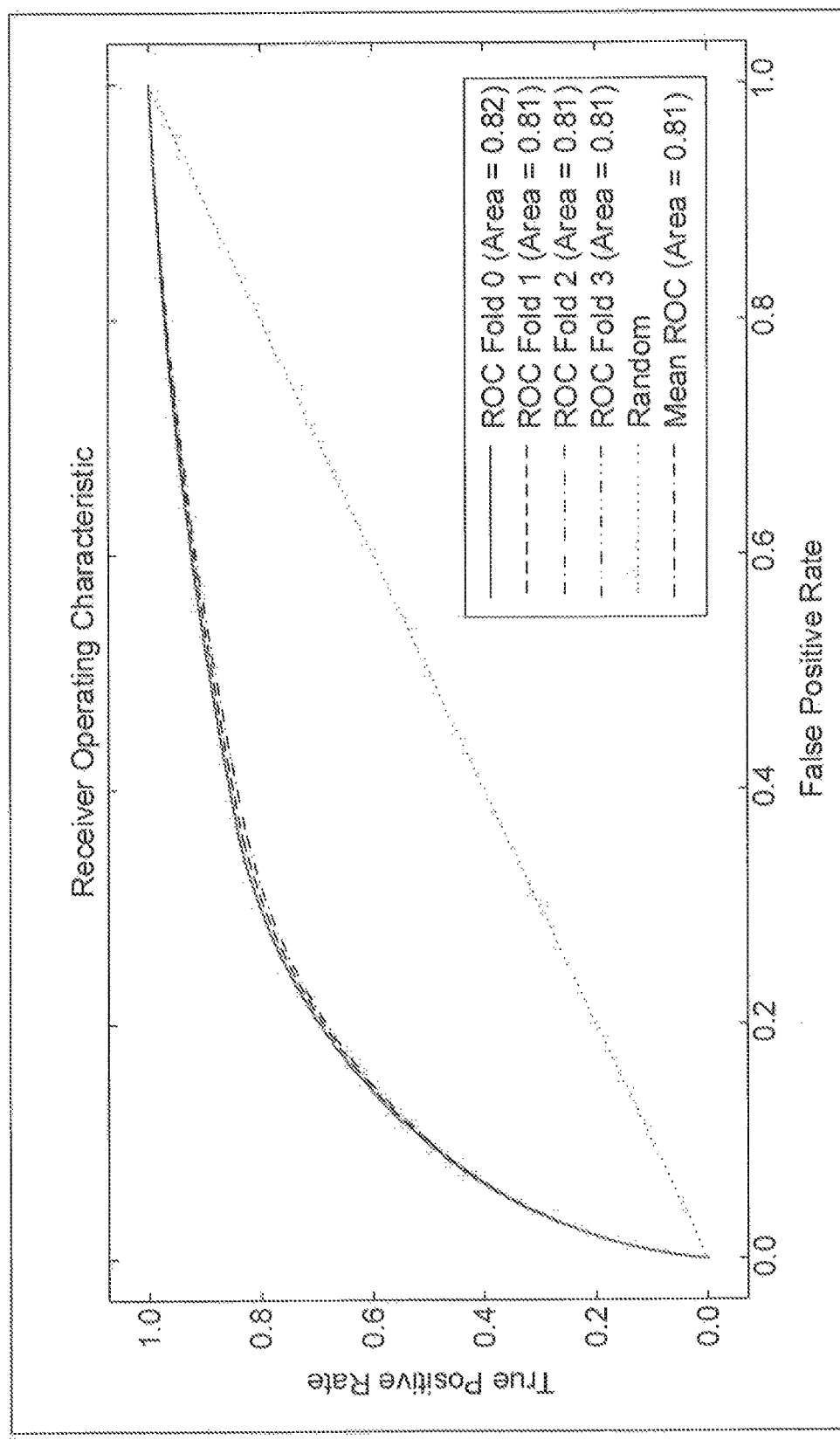
FIG. 8 is a graphical plot illustrating the performance of a prediction engine according to an example embodiment.

FIG. 8 is a graphical plot illustrating the performance of a prediction engine according to an example embodiment. Specifically, the plot is of a receiver operating characteristic (ROC) curve. To evaluate the prediction engine, the training data used on the prediction engine (i.e. the positive and negative training set) is split into four folds using a stratified sampling approach where each fold has a similar number of positive and negative data points. Each line in the plot represents training on three of the folds and then evaluating the accuracy of the prediction engine on the fourth fold. The process is repeated switching around the test fold, resulting in four different lines that use different data to train and test on. Since the four fold lines are shown to be similar and the area under the curve (AUC) is shown to be high, the confidence (i.e. accuracy) in the prediction engine is high.

FIG. 9 is a more detailed flow diagram explaining the process 900 of training and applying a factorization machine according to an example embodiment (i.e. the personalized recommendation steps S303, S304 and S305 of FIG. 3.).

Briefly in FIG. 9, tensor data for a plurality of user-media object pairs is first constructed for input into a factorization machine, such as Dato's GraphLab Create™ factorization machine. Tensor data includes a user identity from user data 141, a media object identity from media object database 130, a sentiment score 141 quantifying positive or negative user propensity for the media object, and the likelihood calculated by the prediction engine 150 that the media object is suitable for the designated style of use (stored in likelihood data 160). The tensor data is then input into factorization machine 170 to generate a model that is capable of receiving as an input a latent feature vector representation of a user and a latent feature vector representation of a media object, and generating as an output a recommendation score quantifying the suitability of the media object for both the designated style of use and the user's listening or viewing preferences. Factorization machine 170 then calculates recommendation scores for a user and one or more media objects from among the media object database 130. Media objects suitable for the designated style of use and personalized for a specific user are then recommended based on the calculated recommendation scores.

In more detail, in step S901, tensor data is constructed for input into a factorization machine, such as Dato's GraphLab Create™ factorization machine. This factorization machine trains one or more models capable of generating a recommendation score for a combination of user and media object. The internal coefficients of the models generated by the factorization machine are learned from known sentiment scores for users and media objects. Recommendations are then made based on the recommendation scores calculated by the models.

Accordingly, the tensor data used for training the factorization machine is defined by tuples each including a user identity from user data 141, a media object identity from media object database 130, a sentiment score 141 quantifying positive or negative user propensity for the media object, and likelihood data calculated by the prediction engine 150. The likelihood is included in the tensor data as a factorization machine side feature (e.g. Graphlab Create™ Factorization Machine side feature) and any number of additional side features may be added to the tensor data. For example, prediction engine 150 may be trained on several different styles of use in order to calculate likelihoods for each style of use. The tensor data inputted into factorization machine 170 may include multiple side features, each side feature including likelihood data for a different style of use. This enables factorization machine 170 to provide personalization results to a specific user for each different style of use provided in the tensor data.

In step S902, the tensor data is input into factorization machine 170.

In step S903, factorization machine 170 generates a model constructed to output a recommendation score for a user-media object pair based on an input of a latent feature vector for a user and a latent feature vector for a media object.

In step S904, the generated model is used to calculate recommendation scores for a plurality of user-media object pairs.

In step S905, the calculated recommendation scores are sorted.

In step S906, media objects from among media object database 130 are recommended as being both suitable for a designated style of use and suitable for a user's listening and/or viewing preferences based on the sorted recommendation scores.

Figure 10:
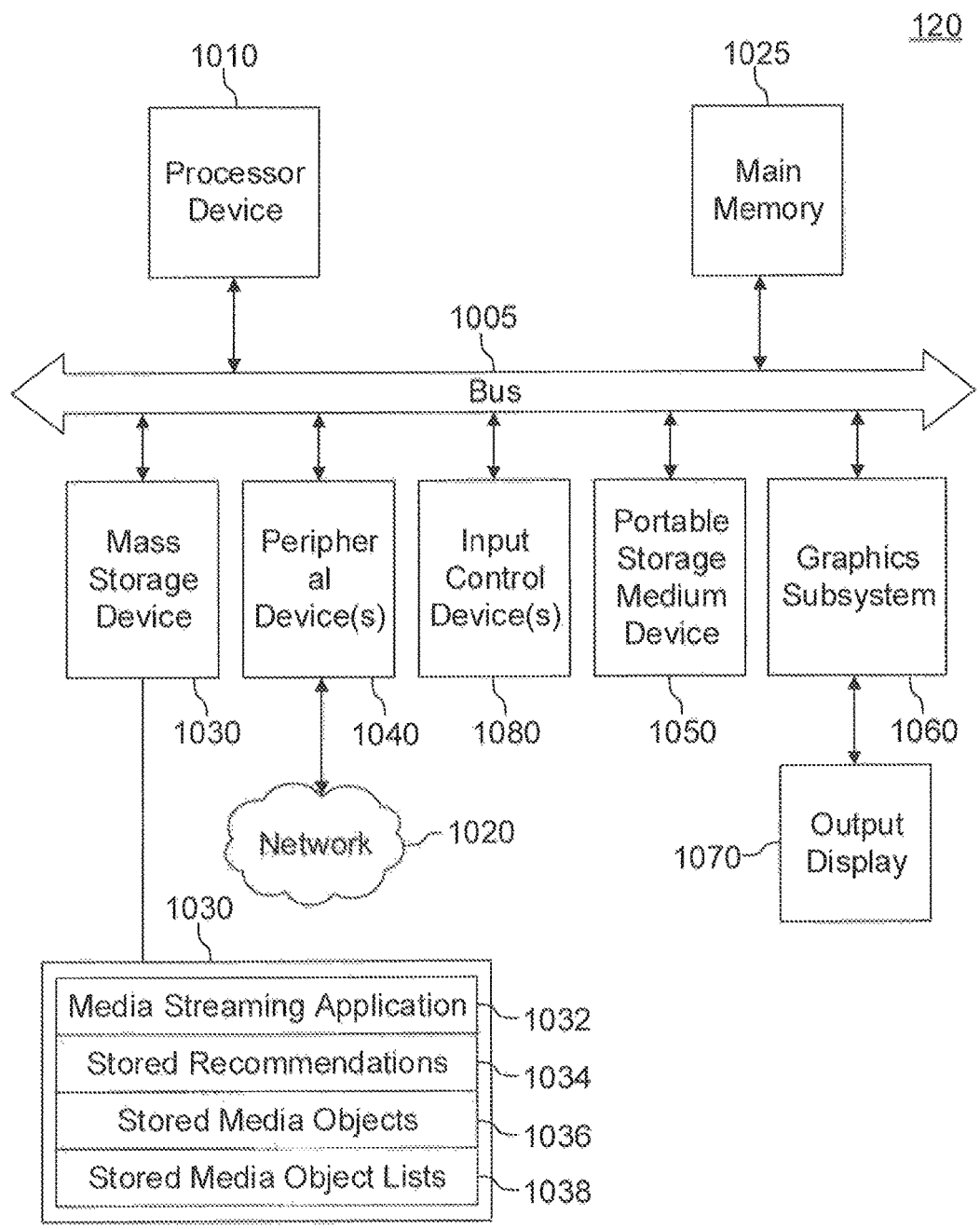
FIG. 10 is a block diagram of a client device according to an example embodiment.

FIG. 10 is a block diagram showing an example of one of client devices 120 (e.g., 120, FIG. 1), in accordance with some of the example embodiments described herein.

The client device 120 may include without limitation a processor device 1010, a main memory 1025, and an interconnect bus 1005. The processor device 1010 may include without limitation a single microprocessor, or may include a plurality of microprocessors for configuring the client device 120 as a multi-processor system. The main memory 1025 stores, among other things, instructions and/or data for execution by the processor device 1010. The main memory 1025 may include banks of dynamic random access memory (DRAM), as well as cache memory.

The client device 120 may further include a mass storage device 1030, peripheral device(s) 1040, portable non-transitory storage medium device(s) 1050, input control device(s) 1080, a graphics subsystem 1060, and/or an output display interface 1070. For explanatory purposes, all components in the client device 120 are shown in FIG. 10 as being coupled via the bus 1005. However, the client device 120 is not so limited. Elements of the client device 120 may be coupled via one or more data transport means. For example, the processor device 1010 and/or the main memory 1025 may be coupled via a local microprocessor bus. The mass storage device 1030, peripheral device(s) 1040, portable storage medium device(s) 1050, and/or graphics subsystem 1060 may be coupled via one or more input/output (I/O) buses. The mass storage device 1030 may be a nonvolatile storage device for storing data and/or instructions for use by the processor device 1010. The mass storage device 1030 may be implemented, for example, with a magnetic disk drive or an optical disk drive. In a software embodiment, the mass storage device 1030 is configured for loading contents of the mass storage device 1030 into the main memory 1025.

Mass storage device 1030 additionally stores media streaming application 1032, stored recommendations 1034, stored media objects 1036 and stored media object lists 1038. Media streaming application 1032 is a software application that enables client device 120 to access and interact with the media content and services made available by media distribution platform 110. Stored recommendations 1034 include recommendations stored for one or more specific users on the client device, such as recommendations provided by factorization machine 170. Stored media objects 1036 include media objects downloaded to client device 120 for offline accessibility, for example, media objects that have been selected based on the stored recommendations 1034. Stored media object lists 1038 include media object lists generated on and/or saved to the client device 120. Alternatively, media object lists generated on the client device 120 may be stored on the server side.

The portable storage medium device 1050 operates in conjunction with a nonvolatile portable storage medium, such as, for example, a compact disc read only memory (CD-ROM), to input and output data and code to and from the client device 120. In some embodiments, the software for storing information may be stored on a portable storage medium, and may be inputted into the client device 120 via the portable storage medium device 1050. The peripheral device(s) 1040 may include any type of computer support device, such as, for example, an input/output (I/O) interface configured to add additional functionality to the client device 120. For example, the peripheral device(s) 1040 may include a network interface card for interfacing the client device 120 with a network 1020.

The input control device(s) 1080 provide a portion of the user interface for a user of the client device 120. The input control device(s) 1080 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the client device 120 may include the graphics subsystem 1060 and the output display 1070. The output display 1070 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. The displays can also be touchscreen displays, such as capacitive and resistive-type touchscreen displays.

The graphics subsystem 1060 receives textual and graphical information, and processes the information for output to the output display 1070.

Input control devices 1080 can control the operation and various functions of client device 120.

Input control devices 1080 can include any components, circuitry, or logic operative to drive the functionality of client device 120. For example, input control device(s) 1080 can include one or more processors acting under the control of an application.

Figure 11:
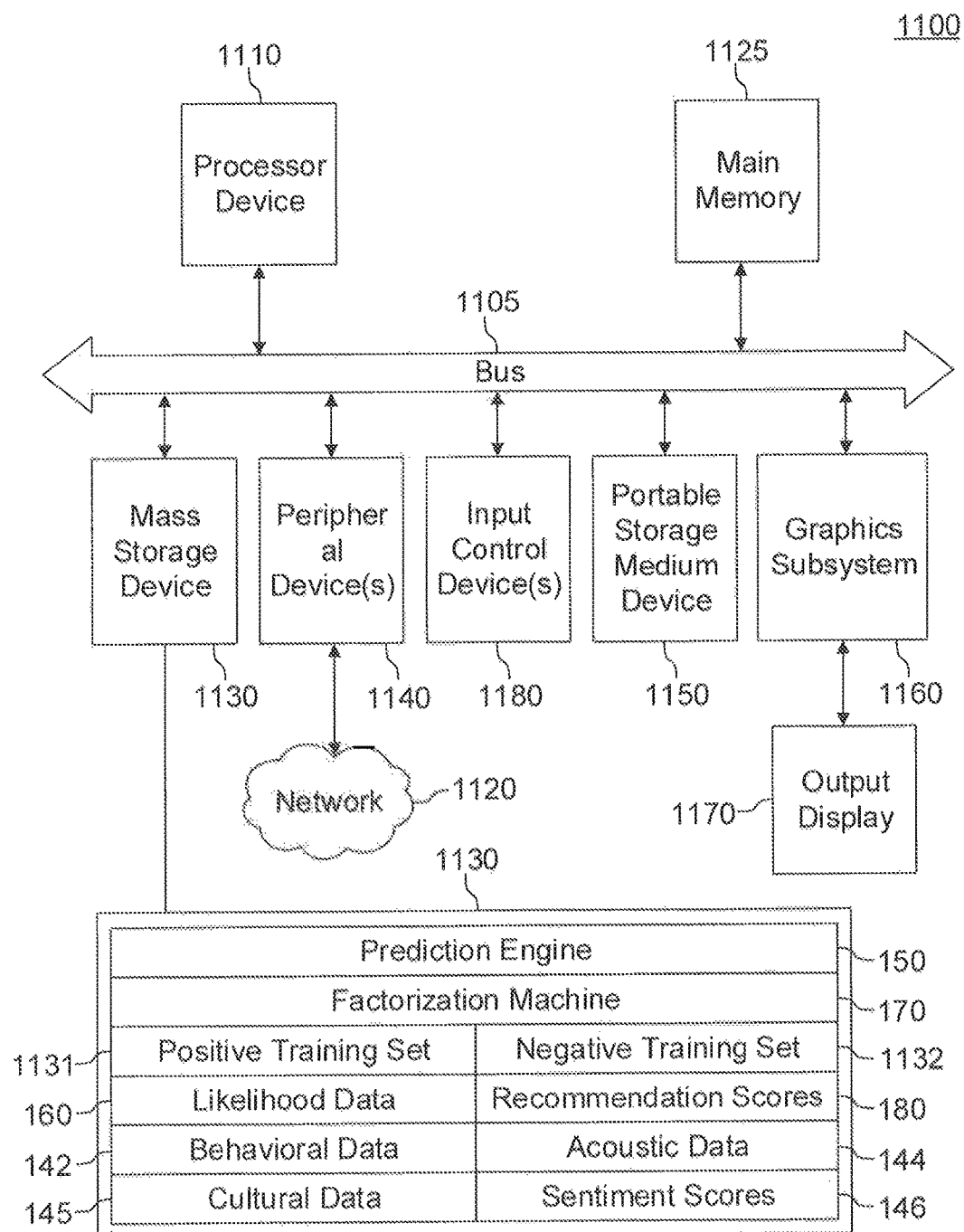
FIG. 11 is a block diagram of a server according to an example embodiment.

FIG. 11 is a block diagram of a special purpose server-side computer 1100 constructed to realize the server-side functionality of the example embodiments. Computer 1100 may include any of processor device 1110, main memory 1125, bus 1105, mass storage device 1130, peripheral devices 1140, input control devices 1180, portable storage medium device 1150, graphics subsystem 1160, and output display 1170, all of which can be configured in the manners described above with respect to the respective elements illustrated in FIG. 10.

The mass storage device 1130 of computer 1100 additionally stores prediction engine 150 and factorization machine 170. Additionally, mass storage device 1130 may store positive training set 1131, negative training set 1132, likelihood data 160, recommendation scores 180, behavioral data 143, acoustic data 144, cultural data 145 and sentiment scores 146 extracted from distributed data storage 140.

Computer 1100 might be incorporated in a stand-alone apparatus or in a multi-component apparatus, such as for grid computing in a cluster of servers or a distributed file system.

Each component of the client device 120 and computer 1100 may represent a broad category of a computer component of a general and/or special purpose computer. Components of the client device 120 and computer 1100 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-11 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of selecting media suitable for a designated style of use from among a database of media objects, comprising the steps of:
    training a prediction engine using a plurality of media object lists, each of the plurality of media object lists containing metadata associated with a plurality of media objects, the plurality of media object lists corresponding to the designated style of use, and the prediction engine being trained to calculate the likelihood that a media object is suitable for the designated style of use, wherein the prediction engine includes a binomial classification model trained with feature vectors that include behavioral data for the plurality of media objects, acoustic data for the plurality of media objects, and cultural data for the plurality of media objects;
    applying the trained prediction engine to media objects in the database of media objects so as to calculate likelihoods that the media objects are suitable for the designated style of use;
    training a factorization machine using tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;
    applying the factorization machine to a specific user and to media objects in the database of media objects to identify media objects suitable for the designated style of use and recommended for the specific user; and
    recommending one or more media objects using the calculated likelihoods.

2. The method according to claim 1, wherein the sentiment score is a negative value when the duration over which the user played the media object is less than a threshold value and the sentiment score is a positive value when the duration over which the user played the media object is greater than the threshold value.

3. The method according to claim 1, wherein training the prediction engine includes:
    selecting a positive set of training media objects including only media objects listed in media object lists corresponding to the designated style of use;
    selecting a negative set of training media objects including media objects among the database of media objects that are not in the positive set;
    generating feature vectors for media objects from both the positive set and the negative set; and
    training the binomial classification model using the feature vectors.

4. The method according to claim 1, wherein training the factorization machine includes:
    generating tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;

inputting the tensor data into the factorization machine; and generating, by the factorization machine, a model constructed to output a recommendation score based on an input of a latent feature vector for a user and a latent feature vector for a media object.

5. The method according to claim 4, wherein applying the factorization machine includes:

calculating recommendation scores for a plurality of user-media object pairs using the model generated by the factorization machine;

sorting the calculated recommendation scores; and recommending media objects from among the database of media objects suitable for the designated style of use and personalized for a specific user based on the sorting of the recommendation scores.

6. The method according to claim 1, wherein the behavioral data comprises latent vectors for media objects among the database of media objects calculated using collaborative filtering methods.

7. The method according to claim 1, wherein the plurality of media object lists corresponding to the designated style of use are user-generated and each has a title that includes a word or phrase associated with the designated style of use.

8. The method according to claim 1, wherein the plurality of media object lists corresponding to the designated style of use is determined to be corresponding to the designated style of use based on analyzing text in titles or tags of the plurality of media object lists.

9. The method according to claim 1, wherein the binomial classification model is a logistic regression model based on the following function:

$$\min_{\omega,c} \frac{1}{2}\omega^T\omega + C\sum_{i=1}^{n}\log(\exp(-y_i(X_i^T\omega + c)) + 1),$$

where n is a number of training data points, $y_i$ is a target value, $X_i$ represents the feature vectors, $\omega$ represents coefficients of the prediction engine, c is a constant scalar value estimated during training of the prediction engine, and C is a regularization parameter.

10. The method according to claim 1, wherein the binomial classification model is comprised of at least one of a decision tree and a support vector machine.

11. A method of recommending media objects for a designated style of use from among a database of media objects, the method comprising:

collecting a positive set of training media objects that are suitable for the designated style of use from multiple media object lists, the multiple media object lists corresponding to the designated style of use;

collecting a negative set of training media objects from media objects among the database of media objects that are not in the positive set;

generating a feature vector for each media object in the positive set and negative set, wherein the feature vectors include behavioral data for the media objects, acoustic data for the media objects and cultural data for the media objects;

training a prediction engine comprising a binomial classification model using the feature vectors;

applying the trained prediction engine to media objects in the database of media objects so as to obtain likelihoods that the media objects are suitable for the designated style of use;

training a factorization machine using tensor data arranged by user for a plurality of media objects, wherein the tensor data includes a user identity, a media object identity, a sentiment score quantifying positive or negative user propensity for the media object, and the likelihood calculated by the prediction engine that the media object is suitable for the designated style of use; and applying the factorization machine to media objects in the database of media objects so as to identify recommended media objects suitable for the designated style of use and recommended for a specific user.

12. A system comprising a non-transitory memory which stores computer-executable process steps and a processing device coupled to the memory and constructed to execute the process steps stored in the memory, wherein the stored process steps include steps which when executed by the processor cause the processor to perform the steps of:

training a prediction engine using a plurality of media object lists, each of the plurality of media object lists containing metadata associated with a plurality of media objects, the plurality of media object lists corresponding to the designated style of use, and the prediction engine being trained to calculate the likelihood that a media object is suitable for the designated style of use, wherein the prediction engine includes a binomial classification model trained with feature vectors that include behavioral data for the plurality of media objects, acoustic data for the plurality of media objects, and cultural data for the plurality of media objects;

applying the trained prediction engine to media objects in the database of media objects so as to calculate likelihoods that the media objects are suitable for the designated style of use;

training a factorization machine using tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;

applying the factorization machine to a specific user and to media objects in the database of media objects to identify media objects suitable for the designated style of use and recommended for the specific user; and recommending one or more media objects using the calculated likelihoods.

13. The system according to claim 12, wherein the sentiment score is a negative value when the duration over which the user played the media object is less than a threshold value and the sentiment score is a positive value when the duration over which the user played the media object is greater than the threshold value.

14. The system according to claim 12, wherein the step of training the prediction engine includes:

selecting a positive set of training media objects including only media objects listed in media object lists corresponding to the designated style of use;

selecting a negative set of training media objects including media objects among the database of media objects that are not in the positive set;

generating feature vectors for media objects from both the positive set and the negative set; and training the binomial classification model using the feature vectors.

15. The system according to claim 12, wherein training the factorization machine includes:

generating tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;

inputting the tensor data into the factorization machine; and generating, by the factorization machine, a model that outputs a recommendation score based on an input of a latent feature vector for a user and a latent feature vector for a media object.

16. The system according to claim 15, wherein applying the factorization machine includes:

calculating recommendation scores for a plurality of user-media object pairs using the model generated by the factorization machine;

sorting the calculated recommendation scores; and recommending media objects from among the database of media objects suitable for the designated style of use and personalized for a specific user based on the sorting of the recommendation scores.

17. The system according to claim 12, wherein the behavioral data comprises latent vectors for media objects among the database of media objects calculated using collaborative filtering methods.

18. The system according to claim 12, wherein the plurality of media object lists corresponding to the designated style of use are user-generated and each have a title that includes a word or phrase associated with the designated style of use.

19. The system according to claim 12, wherein the plurality of media object lists corresponding to the designated style of use are determined to be corresponding to the designated style of use based on analyzing text in titles or tags of the plurality of media object lists.

20. The system according to claim 12, wherein the binomial classification model is a logistic regression model based on the following function:

$$\min_{\omega,c} \frac{1}{2}\omega^T\omega + C\sum_{i=1}^{n} \log(\exp(-y_i(X_i^T\omega + c)) + 1),$$

where n is a number of training data points, $Y_i$ is a target value, $X_i$ represents the feature vectors, $\omega$ represents coefficients of the prediction engine, c is a constant scalar value estimated during training of the prediction engine, and C is a regularization parameter.

21. The system according to claim 12, wherein the binomial classification model is comprised of at least one of a decision tree and a support vector machine.

22. A non-transitory computer-readable storage medium storing a program for causing a computer to implement a method of selecting media suitable for a designated style of use from among a database of media objects, the method comprising the steps of:

training a prediction engine using a plurality of media object lists, each of the plurality of media object lists containing metadata associated with a plurality of media objects, the plurality of media object lists corresponding to the designated style of use, and the prediction engine being trained to calculate the likelihood that a media object is suitable for the designated style of use, wherein the prediction engine includes a binomial classification model trained with feature vectors that include behavioral data for the plurality of media objects, acoustic data for the plurality of media objects, and cultural data for the plurality of media objects;

applying the trained prediction engine to media objects in the database of media objects so as to calculate likelihoods that the media objects are suitable for the designated style of use;

training a factorization machine using tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;

applying the factorization machine to a specific user and to media objects in the database of media objects to identify media objects suitable for the designated style of use and recommended for the specific user; and recommending one or more media objects using the calculated likelihoods.

23. The non-transitory computer-readable storage medium of claim 22, wherein the sentiment score is a negative value when the duration over which the user played the media object is less than a threshold value and the sentiment score is a positive value when the duration over which the user played the media object is greater than the threshold value.

24. The non-transitory computer-readable storage medium of claim 22, wherein training the prediction engine includes:

selecting a positive set of training media objects including only media objects listed in media object lists corresponding to the designated style of use;

selecting a negative set of training media objects including media objects among the database of media objects that are not in the positive set;

generating feature vectors for media objects from both the positive set and the negative set; and training the binomial classification model using the feature vectors.

25. The non-transitory computer-readable storage medium of claim 22, wherein training the factorization machine includes:

generating tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;

inputting the tensor data into the factorization machine; and generating, by the factorization machine, a model that outputs a recommendation score based on an input of a latent feature vector for a user and a latent feature vector for a media object.

26. The non-transitory computer-readable storage medium of claim 25, wherein applying the factorization machine includes:

calculating recommendation scores for a plurality of user-media object pairs using the model generated by the factorization machine;

sorting the calculated recommendation scores; and recommending media objects from among the database of media objects suitable for the designated style of use and personalized for a specific user based on the sorting of the recommendation scores.

27. The non-transitory computer-readable storage medium of claim 22, wherein the behavioral data comprises latent vectors for media objects among the database of media objects calculated using collaborative filtering methods.

28. The non-transitory computer-readable storage medium of claim 22, wherein the plurality of media object lists corresponding to the designated style of use are user-generated and each have a title that includes a word or phrase associated with the designated style of use.

29. The non-transitory computer-readable storage medium of claim 22, wherein the plurality of media object lists corresponding to the designated style of use are determined to be corresponding to the designated style of use based on analyzing text in titles or tags of the plurality of media object lists.

30. The non-transitory computer-readable storage medium of claim 22, wherein the binomial classification model is a logistic regression model based on the following function:

$$\min_{\omega,c} \frac{1}{2}\omega^T\omega + C\sum_{i=1}^{n} \log(\exp(-y_i(X_i^T\omega + c)) + 1),$$

where n is a number of training data points, $y_i$ is a target value, $X_i$ represents the feature vectors, $\omega$ represents coefficients of the prediction engine, c is a constant scalar value estimated during training of the prediction engine, and C is a regularization parameter.

31. The non-transitory computer-readable storage medium of claim 22, wherein the binomial classification model is comprised of at least one of a decision tree and a support vector machine.

32. A method of selecting media suitable for a designated style of use from among a database of media objects, comprising the steps of:

training a prediction engine using a plurality of media object lists, each of the plurality of media object lists containing metadata associated with a plurality of media objects, the plurality of media object lists corresponding to the designated style of use, and the prediction engine being trained to calculate the likelihood that a media object is suitable for the designated style of use, wherein the prediction engine includes a binomial classification model trained with feature vectors that include behavioral data for the plurality of media objects, acoustic data for the plurality of media objects, and cultural data for the plurality of media objects, wherein training the prediction engine includes:

selecting a positive set of training media objects including only media objects listed in media object lists corresponding to the designated style of use, selecting a negative set of training media objects including media objects among the database of media objects that are not in the positive set, generating feature vectors for media objects from both the positive set and the negative set, and training the binomial classification model using the feature vectors;

applying the trained prediction engine to media objects in the database of media objects so as to calculate likelihoods that the media objects are suitable for the designated style of use; and recommending one or more media objects using the calculated likelihoods.

33. The method according to claim 32, further comprising the steps of:

training a factorization machine using tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use; and applying the factorization machine to a specific user and to media objects in the database of media objects to identify media objects suitable for the designated style of use and recommended for the specific user.

34. The method according to claim 33, wherein the sentiment score is a negative value when the duration over which the user played the media object is less than a threshold value and the sentiment score is a positive value when the duration over which the user played the media object is greater than the threshold value.

35. The method according to claim 33, wherein training the factorization machine includes:

generating tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;

inputting the tensor data into the factorization machine; and generating, by the factorization machine, a model constructed to output a recommendation score based on an input of a latent feature vector for a user and a latent feature vector for a media object.

36. The method according to claim 35, wherein applying the factorization machine includes:

calculating recommendation scores for a plurality of user-media object pairs using the model generated by the factorization machine;

sorting the calculated recommendation scores; and recommending media objects from among the database of media objects suitable for the designated style of use and personalized for a specific user based on the sorting of the recommendation scores.

37. The method according to claim 32, wherein the behavioral data comprises latent vectors for media objects among the database of media objects calculated using collaborative filtering methods.

38. The method according to claim 32, wherein the plurality of media object lists corresponding to the designated style of use are user-generated and each has a title that includes a word or phrase associated with the designated style of use.

39. The method according to claim 32, wherein the plurality of media object lists corresponding to the designated style of use is determined to be corresponding to the designated style of use based on analyzing text in titles or tags of the plurality of media object lists.

40. The method according to claim 32, wherein the binomial classification model is a logistic regression model based on the following function:

$$\min_{\omega,c} \frac{1}{2}\omega^T\omega + C\sum_{i=1}^{n}\log(\exp(-y_i(X_i^T\omega + c)) + 1),$$

where n is a number of training data points, $y_i$ is a target value, $X_i$ represents the feature vectors, $\omega$ represents coefficients of the prediction engine, c is a constant scalar value estimated during training of the prediction engine, and C is a regularization parameter.

41. The method according to claim 32, wherein the binomial classification model is comprised of at least one of a decision tree and a support vector machine.

42. A system comprising a non-transitory memory which stores computer-executable process steps and a processing device coupled to the memory and constructed to execute the process steps stored in the memory, wherein the stored process steps include steps which when executed by the processor cause the processor to perform the steps of:
   training a prediction engine using a plurality of media object lists, each of the plurality of media object lists containing metadata associated with a plurality of media objects, the plurality of media object lists corresponding to the designated style of use, and the prediction engine being trained to calculate the likelihood that a media object is suitable for the designated style of use, wherein the prediction engine includes a binomial classification model trained with feature vectors that include behavioral data for the plurality of media objects, acoustic data for the plurality of media objects, and cultural data for the plurality of media objects, wherein training the prediction engine includes:
      selecting a positive set of training media objects including only media objects listed in media object lists corresponding to the designated style of use,
      selecting a negative set of training media objects including media objects among the database of media objects that are not in the positive set,
      generating feature vectors for media objects from both the positive set and the negative set, and
      training the binomial classification model using the feature vectors;
   applying the trained prediction engine to media objects in the database of media objects so as to calculate likelihoods that the media objects are suitable for the designated style of use; and
   recommending one or more media objects using the calculated likelihoods.

43. The system according to claim 42, wherein the stored process steps further include steps which when executed by the processor cause the processor to perform the steps of:
   training a factorization machine using tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use; and
   applying the factorization machine to a specific user and to media objects in the database of media objects to identify media objects suitable for the designated style of use and recommended for the specific user.

44. The system according to claim 43, wherein the sentiment score is a negative value when the duration over which the user played the media object is less than a threshold value and the sentiment score is a positive value when the duration over which the user played the media object is greater than the threshold value.

45. The system according to claim 43 wherein training the factorization machine includes:
   generating tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;
   inputting the tensor data into the factorization machine; and
   generating, by the factorization machine, a model that outputs a recommendation score based on an input of a latent feature vector for a user and a latent feature vector for a media object.

46. The system according to claim 45, wherein applying the factorization machine includes:
   calculating recommendation scores for a plurality of user-media object pairs using the model generated by the factorization machine;
   sorting the calculated recommendation scores; and
   recommending media objects from among the database of media objects suitable for the designated style of use and personalized for a specific user based on the sorting of the recommendation scores.

47. The system according to claim 42, wherein the behavioral data comprises latent vectors for media objects among the database of media objects calculated using collaborative filtering methods.

48. The system according to claim 42, wherein the plurality of media object lists corresponding to the designated style of use are user-generated and each have a title that includes a word or phrase associated with the designated style of use.

49. The system according to claim 42, wherein the plurality of media object lists corresponding to the designated style of use are determined to be corresponding to the designated style of use based on analyzing text in titles or tags of the plurality of media object lists.

50. The system according to claim 42, wherein the binomial classification model is a logistic regression model based on the following function:

$$\min_{\omega,c} \frac{1}{2}\omega^T\omega + C\sum_{i=1}^{n}\log(\exp(-y_i(X_i^T\omega + c)) + 1),$$

where n is a number of training data points, $Y_i$ is a target value, $X_i$ represents the feature vectors, $\omega$ represents coefficients of the prediction engine, c is a constant scalar value estimated during training of the prediction engine, and C is a regularization parameter.

51. The system according to claim 42, wherein the binomial classification model is comprised of at least one of a decision tree and a support vector machine.

52. A non-transitory computer-readable storage medium storing a program for causing a computer to implement a method of selecting media suitable for a designated style of use from among a database of media objects, the method comprising the steps of:

training a prediction engine using a plurality of media object lists, each of the plurality of media object lists containing metadata associated with a plurality of media objects, the plurality of media object lists corresponding to the designated style of use, and the prediction engine being trained to calculate the likelihood that a media object is suitable for the designated style of use, wherein the prediction engine includes a binomial classification model trained with feature vectors that include behavioral data for the plurality of media objects, acoustic data for the plurality of media objects, and cultural data for the plurality of media objects, wherein training the prediction engine includes:

selecting a positive set of training media objects including only media objects listed in media object lists corresponding to the designated style of use, selecting a negative set of training media objects including media objects among the database of media objects that are not in the positive set, generating feature vectors for media objects from both the positive set and the negative set, and training the binomial classification model using the feature vectors;

applying the trained prediction engine to media objects in the database of media objects so as to calculate likelihoods that the media objects are suitable for the designated style of use; and recommending one or more media objects using the calculated likelihoods.

53. The non-transitory computer-readable storage medium according to claim 52, wherein the program further causes the computer to implement the steps of:

training a factorization machine using tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use; and applying the factorization machine to a specific user and to media objects in the database of media objects to identify media objects suitable for the designated style of use and recommended for the specific user.

54. The non-transitory computer-readable storage medium of claim 53, wherein the sentiment score is a negative value when the duration over which the user played the media object is less than a threshold value and the sentiment score is a positive value when the duration over which the user played the media object is greater than the threshold value.

55. The non-transitory computer-readable storage medium of claim 53, wherein training the factorization machine includes:

generating tensor data for a plurality of user-media object pairs, wherein the tensor data includes a user identity, a media object identity, a sentiment score quantifying positive or negative user propensity for the media object, and the likelihood calculated by the prediction engine that the media object is suitable for the designated style of use;

inputting the tensor data into the factorization machine; and generating, by the factorization machine, a model that outputs a recommendation score based on an input of a latent feature vector for a user and a latent feature vector for a media object.

56. The non-transitory computer-readable storage medium of claim 55, wherein applying the factorization machine includes:

calculating recommendation scores for a plurality of user-media object pairs using the model generated by the factorization machine;

sorting the calculated recommendation scores; and recommending media objects from among the database of media objects suitable for the designated style of use and personalized for a specific user based on the sorting of the recommendation scores.

57. The non-transitory computer-readable storage medium of claim 52, wherein the behavioral data comprises latent vectors for media objects among the database of media objects calculated using collaborative filtering methods.

58. The non-transitory computer-readable storage medium of claim 52, wherein the plurality of media object lists corresponding to the designated style of use are user-generated and each have a title that includes a word or phrase associated with the designated style of use.

59. The non-transitory computer-readable storage medium of claim 52, wherein the plurality of media object lists corresponding to the designated style of use are determined to be corresponding to the designated style of use based on analyzing text in titles or tags of the plurality of media object lists.

60. The non-transitory computer-readable storage medium of claim 52, wherein the binomial classification model is a logistic regression model based on the following function:

$$\min_{\omega,c} \frac{1}{2}\omega^T \omega + C \sum_{i=1}^{n} \log(\exp(-y_i(X_i^T \omega + c)) + 1),$$

where n is a number of training data points, $y_i$ is a target value, $X_i$ represents the feature vectors, $\omega$ represents coefficients of the prediction engine, c is a constant scalar value estimated during training of the prediction engine, and C is a regularization parameter.

61. The non-transitory computer-readable storage medium of claim 52, wherein the binomial classification model is comprised of at least one of a decision tree and a support vector machine.

* * * * *